(No Model.)
C. WILLMS.
ELECTRIC BATTERY AND METHOD OF SEALING BATTERY CELLS.
No. 554,761. Patented Feb. 18, 1896.
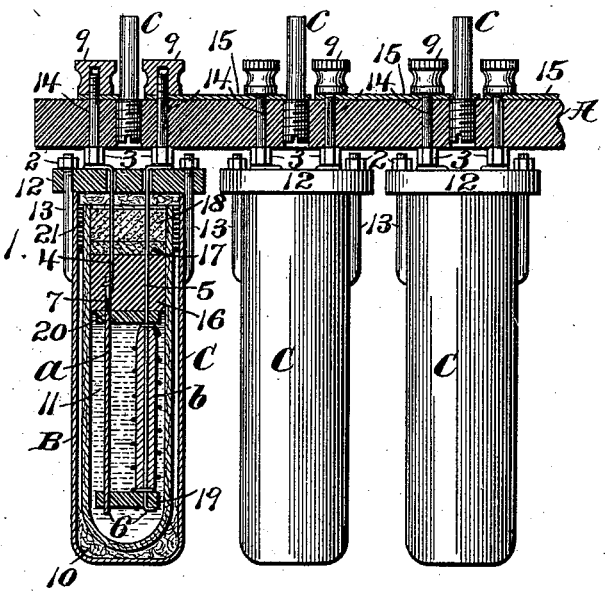
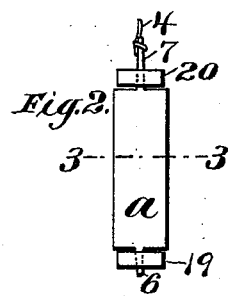
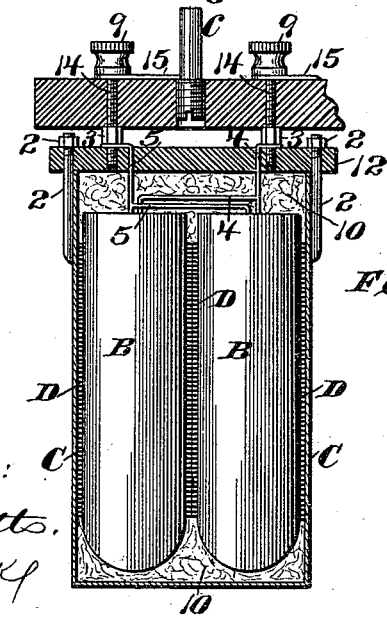
Attest:
Geo. H. Botts.
A. V. Bourk
Inventor
Charles Willms
by Philipp Mnson & Phelps
Attys

UNITED STATES PATENT OFFICE.

CHARLES WILLMS, OF BALTIMORE, MARYLAND.

ELECTRIC BATTERY AND METHOD OF SEALING BATTERY-CELLS.

SPECIFICATION forming part of Letters Patent No. 554,761, dated February 18, 1896.

Application filed July 12, 1894. Serial No. 517,361. (No model.)

*To all whom it may concern:*

Be it known that I, CHARLES WILLMS, a citizen of the United States, residing at Baltimore city, in the State of Maryland, have invented certain new and useful Improvements in Electric Batteries and Methods of Sealing Battery-Cells, fully described and represented in the following specification and the accompanying drawings, forming a part of the same.

The object of the present invention is to provide an improved battery of that class known as "dry-cell batteries," consisting of a number of small cells, and especially to improve the construction of the individual cells, and to provide a simple method of sealing the same.

In other applications, Serial Nos. 472,867, filed May 3, 1893, and 497,402, filed January 19, 1894, I have described and claimed constructions in which the cells are supported in the cell-support of the battery by enlarged terminals, these terminals being secured to the cell-support by removable devices of such construction that the cells are held firmly in position and at the same time may readily be removed and new cells be substituted therefor.

The present invention includes certain improvements designed for use in such constructions and intended to increase the efficiency and lessen the cost of manufacture of the cells; and the invention therefore will be illustrated as applied in connection with such constructions, although it will be understood that these improvements are generally applicable to cells not employing the enlarged supporting-terminals.

For a full understanding of the invention a detailed description will now be given of constructions embodying the same in the preferred form, reference being had to the accompanying drawings, forming a part of this specification, in which—

Figure 1 is a vertical section of a portion of the cell-support, showing three individual cells supported thereby, each of the cells being supported singly and one of the cells being shown in section. Fig. 2 is a side view of the elements removed from a cell. Fig. 3 is a cross-section on the line 3 of Fig. 2. Fig. 4 is a similar view to Fig. 1, showing in section a construction in which two cells are grouped within a single case so as to form a double cell, and this mounted in the cell-support.

Referring to the drawings, A is the cell-support, and B the cells, the cell-support consisting in the form shown of a plate of non-conducting material to which the cells are secured so as to be inserted in and removed from the cell-case with the support, as usual in such constructions. The cells B are shown as the common glass dry chloride-of-silver cells, containing the battery fluid 11 and the elements $a\ b$, and are fully described in many prior Letters Patent—*e. g.*, Nos. 450,840, 479,541, 437,469, 421,801, 414,627, 403,451, 374,863, and 374,862—the construction being varied in accordance with the present invention.

In the construction shown in Fig. 1 each of the glass cells B is inserted within a case C, preferably of metal, and the cell preferably rests upon cotton 10 or similar material at the bottom of the case, and a space at the top of the cell, also left and filled with similar absorbent material 10, as shown. The cell-case C is covered by a cap 12 of suitable non-conducting material, preferably vulcanized fiber, which is secured thereon by screw-rods 13, soldered or otherwise secured to or formed on the outside of the case and passing through holes in the cap 12 with nuts 2 outside the cap, by which means the cap may be forced down hard upon the case so as to close it tightly.

The cell is supported in the support A by two screw-rods 14 carried by the cap 12 and preferably screwed into the cap at opposite sides, as shown, these rods having thereon nuts 3, as shown, by which close contact is made with the terminals 4 5, which consist of the usual wires connected to the respective elements $a\ b$ and passing through openings in the cap 12 to the outside of the cell, where they are twisted about the rods 14, the rods 14 thus forming extended and enlarged supporting-terminals, which pass through holes in the cell-support and are secured thereon by nuts or screw-caps 9, which screw down and make contact with the conducting-plates 15, by which connection is made between the terminals 14 and the battery connectors $c$.

The construction thus far described is substantially the same as described and claimed in my prior application, Serial No. 497,402, above referred to; but it will be understood that the features forming the invention may be applied in other constructions.

Referring now to the features forming the invention, the cells have previously been closed above the battery fluid by plugs of viscous or semifluid material—such, for instance, as a mixture of resin and resin-oil, which always remains semifluid—and sealing-plugs outside said viscous plugs formed of plaster-of-paris or similar material which forms a tight joint on setting. In sealing cells in this manner it has been found that the cell is liable to leak around the plaster-of-paris plug, this result probably being caused by the heat and weight of the plaster plug producing a concave depression in the top of the viscous plug, so that the plaster-of-paris tapers very slightly from the top downward. I have discovered that a practically perfect sealing of the cells may be secured by applying outside of the viscous plug a plurality of plugs, the inner plug supporting the outer plug being of any suitable material preventing the transmission of heat from the plaster-of-paris plug to the viscous material. This inner or supporting plug is preferably comparatively thin, so as to leave space outside the same for a comparatively thick sealing-plug, as shown in the drawings, 16 being the viscous plug, 17 the supporting-plug, and 18 the sealing-plug; but the supporting-plug may be thicker, if desired. The supporting-plug may be of leather or any other suitable material, solid when applied; but it will be found preferable to make this supporting-plug also of plaster-of-paris or similar material which can be applied in plastic form and which hardens on setting, as such material can be more readily placed in position about the terminals, and it will be found that with these two plugs of plastic material, the inner of which forms the supporting-plug and the outer the sealing-plug, a satisfactory sealing is secured.

In filling the cell, it is important that the elements $a\,b$ and the terminals 4 5 shall be held in proper position so as to prevent short-circuiting in using the cell, and it is desirable also that the elements $a\,b$ be held rigidly at the proper distance apart within the battery fluid after the cell is completed. For this purpose I have devised the following construction:

Each of the elements $a\,b$ is provided at its lower end with an extension or stud 6, which extensions pass through holes in a separating-plate 19, so that the lower or free ends of the elements are thus held at a fixed distance apart during filling and after the cell is completed, the separating-plate 19 being formed of any suitable non-conducting material, preferably vulcanized fiber. In the construction shown the projection 6 on the zinc element $a$ is formed on the element, and the projection on the chloride-of-silver element, which consists of the usual block of chloride of silver having the terminal 5 passing through it, is formed by extending the terminal below the chloride of silver and through the opening in the separating-plate 19 and clinching the end on the plate, so as to hold the latter. It will be understood, however, that with any other construction of elements these projections may be formed in any suitable manner. The upper ends of the elements $a\,b$ are also preferably held apart by a second non-conducting separating-plate 20, the zinc element $a$ being formed with a second projection 7 similar to that at the bottom, and the terminal 5 of the chloride-of-silver element passing through the non-conducting plate 20. By this construction the elements are held rigidly in position at both ends, so that during the filling of the cell and afterward there is no danger of their being thrown out of relative position. This upper plate 20 is preferably provided with a recess 8 on the side for convenience in filling.

A further improvement consists in bringing the chloride-of-silver element close to the glass, so that it may be examined from the outside to determine how long before it will be exhausted. This result is secured without separating the zinc and chloride of silver too far by placing the openings in the blocks 19 20 for the chloride-of-silver element to one side, so as to bring the silver element close to the glass, while the zinc element may be nearer the center of the cell, and thus the proper distance between the elements be preserved. It will be understood that this feature of providing for examination from the outside of the cell may be applied to both elements in any construction in which this is desirable; but in the chloride-of-silver cell it is not necessary to examine the zinc element, so that only the silver element need be brought close to the glass.

In cases in which the terminals are soldered to the elements it is important to avoid short-circuiting between the solder and the element or terminal, and this result is secured in the construction shown, in which the terminal 4 is soldered to the projection 7 at the end of the element $a$ by extending the element outside the fluid or into the viscous plug 16 and forming the connection with the terminal within the latter, so that there can be no electrical action between the solder and metal of the terminal or element, as there might be in case this connection was made at points within the battery fluid.

Before placing the cell in the case C a sheathing of paper 21 is preferably placed about the glass, extending from the open end of the cell within the case a suitable distance. I am thus enabled to secure a tight joint between the cell and case, and, moreover, thus strengthen the construction.

It will be understood that it is not essential that a single glass cell be used in each case, but the cell secured to the support may consist of two or more such individual glass cells within a single case, the latter being secured to the support, as in the construction shown.

In Fig. 4 such a construction is shown, in which a case for each two glass cells is used, the respective terminals of the individual cells being connected inside the case C, so that only one pair of terminals pass to the outside. In this construction each of the glass cells is placed in a tube D, preferably of pasteboard, to avoid breakage of the cells, and the space within the cell-case about the tubes and above and below the cells is packed with absorbent material 10, as in the construction previously described.

It will be seen that the invention provides a very simple, efficient and convenient construction of cell. It will be understood that modifications may be made in the devices shown while employing the invention claimed, and I am not to be limited to the exact form of the constructions shown.

What is claimed is—

1. The method of sealing a battery-cell which consists in inserting outside the battery fluid a plug of viscous material, inserting outside of and upon said viscous plug a supporting-plug, and inserting outside of and upon said supporting-plug a sealing-plug in a plastic condition and formed of plastic material which expands on setting, substantially as described.

2. The method of sealing a battery-cell which consists in inserting outside the battery fluid a plug of viscous material, inserting outside of and upon said viscous plug a thin supporting-plug of plastic material which expands on setting, and inserting outside of and upon said supporting-plug a thick sealing-plug in a plastic condition and formed of plastic material which expands on setting, substantially as described.

3. A sealed battery-cell, having outside the battery fluid a plug of viscous material, a supporting-plug outside of and resting upon said viscous plug, and a sealing-plug of plastic material that expands on setting outside of and upon said supporting-plug, substantially as described.

4. A sealed battery-cell, having outside the battery fluid a plug of viscous material, a supporting-plug of plastic material that expands on setting outside of and upon said viscous plug, and a sealing-plug of plastic material that expands on setting outside of and upon said supporting-plug, substantially as described.

5. A sealed battery-cell, having outside the battery fluid a plug of viscous material, a thin supporting-plug of plastic material that expands on setting outside of and upon said viscous plug, and a thick sealing-plug of plastic material that expands on setting outside of and upon said supporting-plug, substantially as described.

6. A glass cell having a silver element provided with projections beyond the silver at the opposite ends of the latter and having non-conducting separating-plates supported and carried by said projections and the other cell element, said plates lying outside of the silver element and arranged to hold the elements at a fixed distance apart with the silver element so close to the glass as to permit its examination from outside the cell, substantially as described.

7. A glass cell having a viscous sealing-plug, a silver element provided with a terminal extending beyond the silver at the opposite ends of the latter, a second element extending outside the battery fluid into the sealing-plug and soldered to its terminal in said sealing-plug and having non-conducting separating-plates supported and carried by said elements, said plates lying outside the silver element and arranged to hold the elements at a fixed distance apart with the silver element so close to the glass as to permit its examination from outside the cell, substantially as described.

8. The combination with the elements $a$, $b$, said element $a$ having projections at its opposite ends, non-conducting plates 19, 20 at opposite ends of the terminals and supported and carried thereby, said plates being provided with openings receiving said projections on element $a$ and through which the terminal of element $b$ passes at both ends of the terminal and beyond the latter, whereby the elements are held at a fixed distance apart at both ends and the plates supported without waste of element $b$, substantially as described.

9. The combination with the sealed cell B, of cell-case C having a cell-space larger than the cell, and a sheathing of paper 21 wrapped about the sealed end of the cell and filling the cell-space for only a portion of the length of the cell, whereby the cell is held rigidly in position in the case and the passage of fluid from the cell-space at the sealed end of the cell prevented, substantially as described.

10. The combination with the cell B having the elements $a$, $b$, non-conducting separating-plates 19, 20 carried by and at opposite ends of the elements, viscous plug 16, supporting-plug 17 and sealing-plug 18 outside the viscous plug, terminals 4, 5 passing through said plugs, case C inclosing one or more of said cells, non-conducting cap 12 on said cell-case through which the terminals pass, enlarged supporting-terminals 14, with which said terminals 4, 5 connect outside the cell-case, and removable devices for securing said terminals 14 in the cell-support, substantially as described.

In testimony whereof I have hereunto set my hand in the presence of two subscribing witnesses.

CHARLES WILLMS.

Witnesses:
 THOS. J. BOHANNAN,
 PHILIPP SEIBERT.